United States Patent
Cho (10) Patent No.: US 7,711,076 B2
(45) Date of Patent: May 4, 2010

(54) POWER CONTROL FOR A DIGITAL BROADCAST RECEIVING TERMINAL

(75) Inventor: Nam Shin Cho, Seoul (KR)

(73) Assignee: LG Electronics Inc., Seoul (KR)

(*) Notice: Subject to any disclaimer, the term of this patent is extended or adjusted under 35 U.S.C. 154(b) by 997 days.

(21) Appl. No.: 11/413,384

(22) Filed: Apr. 28, 2006

(65) Prior Publication Data

US 2006/0245525 A1 Nov. 2, 2006

(30) Foreign Application Priority Data

Apr. 29, 2005 (KR) ............... 10-2005-0035940

(51) Int. Cl.
*H04B 7/10* (2006.01)
(52) U.S. Cl. ................. 375/347; 455/135
(58) Field of Classification Search ............. 375/347, 375/267; 455/132–135
See application file for complete search history.

(56) References Cited

U.S. PATENT DOCUMENTS

| | | | | |
|---|---|---|---|---|
| 6,678,508 | B1 * | 1/2004 | Koilpillai et al. | ............ 455/137 |
| 2003/0153358 | A1 * | 8/2003 | Moon et al. | ............ 455/561 |

FOREIGN PATENT DOCUMENTS

| | | |
|---|---|---|
| JP | 10-028065 | 1/1998 |
| JP | 2000-138654 | 5/2000 |
| JP | 2000252896 | 9/2000 |
| JP | 2000-332665 | 11/2000 |
| JP | 2003-283405 | 10/2003 |
| JP | 2004-297281 | 10/2004 |
| JP | 2004-320528 | 11/2004 |
| KR | 10 2006-0022506 A | 3/2006 |
| WO | 2004054132 | 6/2004 |

* cited by examiner

*Primary Examiner*—Kevin Y Kim
(74) *Attorney, Agent, or Firm*—Lee, Hong, Degerman, Kang & Waimey (57) ABSTRACT

A receiver for a digital broadcast terminal includes first and second receiving units, each for receiving a digital broadcast signal. Each of the first and second receiving units typically includes an antenna, a tuner, and an analog/digital (A/D) converter. The receiver further includes a control unit configured to determine reception environment based upon the digital broadcast signal, and to selectively operate the first and the second receiving units based upon the reception environment. A method for controlling a digital broadcast receiving terminal includes receiving a digital broadcast signal at first and second receiving units, determining reception environment based upon the digital broadcast signal, and selectively operating the first and second receiving units based upon the reception environment.

35 Claims, 6 Drawing Sheets

POWER CONTROL FOR A DIGITAL BROADCAST RECEIVING TERMINAL

CROSS-REFERENCE TO RELATED APPLICATIONS

Pursuant to 35 U.S.C. §119(a), this application claims the benefit of earlier filing date and right of priority to Korean Application No. 10-2005-0035940, filed on Apr. 29, 2005, the contents of which are hereby incorporated by reference herein in their entirety

BACKGROUND OF THE INVENTION

1. Field of the Invention

The present invention relates to a digital broadcast receiving terminal, and more particularly to power control for a digital broadcast receiving terminal.

2. Discussion of the Related Art

System-E type digital broadcast receivers typically utilize two antennas to enhance reception. This antenna arrangement is useful in compromised reception environments, such that two antennas allow for higher gain as compared to a single antenna receiver. A receiver implementing two antennas typically requires a corresponding pair of tuner units which are unconditionally activated. The baseband end is also unconditionally activated to correspond to the activated tuner units.

Although a two antenna arrangement is useful to maximize reception quality, two antennas have space and power requirements which are greater than single antenna systems. Conventional receivers typically have either a single antenna system or a two antenna system. In relatively clear reception environments, a single antenna may be sufficient to provide the desired level of reception quality. Single antenna systems have relatively lower power consumption needs, but have limited reception capabilities in compromised reception environments. On the other hand, two antenna receivers have greater reception capabilities in various types of reception environments, but such systems require more power because of the two antennas and associated components. Accordingly, there is a need for a receiver that is capable of switching between one and two active antennas as the need arises.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a receiver for a digital broadcast terminal includes first and second receiving units each for receiving a digital broadcast signal. The receiver further includes a control unit, configured to determine reception environment based upon the digital broadcast signal, and to selectively operate the first and second receiving units based upon the reception environment.

In one aspect, both of the first and the second receiving units are initially activated, and the control unit is further configured to detect bit error rate (BER), prior to decoding, of the digital broadcast signal. If the BER does not exceed a first threshold value, then the control unit is further configured to determine an activated receiving unit, the activated receiving unit being defined as one of the first or second receiving units that is assigned to a reference finger, and determine a signal-to-noise ratio (SNR) for an antenna associated with the activated receiving unit. If the SNR of the receiving unit that is assigned to the reference finger exceeds a second threshold value, then the control unit is further configured to apply power to the activated receiving unit, and discontinue power to a discontinued receiving unit, the discontinued receiving unit being defined as one of the first or second receiving units that is not assigned to the reference finger.

In another aspect, both of the first and second receiving units are initially activated, such that the control unit is further configured to determine the BER, prior to decoding, of the digital broadcast signal. If the BER does not exceed a threshold value, then the control unit is further configured to identify an activated receiving unit, the activated receiving unit being defined as one of the first or second receiving units that includes an antenna having a relatively higher SNR. In addition, the control unit may be further configured to apply power to the activated receiving unit, and discontinue power to a discontinued receiving unit, the discontinued receiving unit being defined as one of the first or second receiving units that includes an antenna having a relatively lower SNR.

According to one feature, only the first receiving unit is initially activated and the second receiving unit is initially discontinued. In such an embodiment the control unit is further configured to determine the BER, prior to decoding, of the digital broadcast signal. If the BER exceeds a threshold value, then the control unit is further configured to continue to activate the first receiving unit, and also activate the second receiving unit.

Another feature provides that if the reception environment does not meet a predetermined quality level in condition of the first and second antenna are activated, then the control unit is further configured to (a) activate the first and second receiving units. Otherwise, if the reception environment meets or exceeds the predetermined quality level, then the control unit is further configured to (b) activate only one receiving unit of the first and second receiving units. If desired, the control unit may be further configured to repeatedly determine the reception environment, and repeat operations (a) and (b).

In another aspect, if the reception environment does not meet a predetermined quality level, then the control unit is further configured to (a) apply power to the first and second receiving units. Otherwise, if the reception environment meets or exceeds the predetermined quality level, then the control unit is further configured to (b) apply power to the first receiving unit, and (c) discontinue power to the second receiving unit. If desired, the control unit is further configured to perform operation (a) by applying power to a tuner and an analog/digital (A/D) converter associated with the first receiving unit, and applying power to a tuner and an A/D converter associated with the second receiving unit. In still another aspect, the control unit is further configured to perform operation (b) by applying power to a tuner and an A/D converter associated with the first receiving unit. Moreover, the discontinuing operation (c) includes discontinuing power to a tuner and an A/D converter associated with the second receiving unit. If desired, the control unit is further configured to repeatedly determine the reception environment, and repeat operations (a) through (c).

According to one feature, if the reception environment does not meet a predetermined quality level while only the first receiving unit is activated, then the control unit is further configured to activate the second receiving unit so that both the first and the second receiving units are concurrently activated for a period of time.

In another aspect, the control unit is further configured to detect the BER, prior to decoding, of the digital broadcast signal, determine a SNR for an antenna associated with the first receiving unit, determine a SNR for an antenna associated with the second receiving unit, and determine reference finger antenna assignment to identify which antenna of the first and second receiving unit is assigned to the reference finger.

In another feature, if the reception environment does not meet a predetermined quality level while only the first receiving unit is activated, then the control unit is further configured to activate the second receiving unit so that both the first and the second receiving units are concurrently activated.

In yet another aspect, if the reception environment does not meet a predetermined quality level while only the first receiving unit is activated, then the control unit is further configured to obtain an auto gain control (AGC) value associated the first receiving unit, which is currently activated, utilize the AGC value for the second receiving unit to facilitate antenna stabilization, and activate the second receiving unit so that both the first and the second receiving units are concurrently activated.

In another aspect, each of the first and the second receiving units include an antenna, a tuner, and an A/D converter.

Another feature includes the receiver having a code division multiplexing (CDM) demodulator for demodulating first and second signals received by the first and second receiving unit, a SNR extracting unit for extracting SNRs of the first and second signals received from the CDM demodulator, and a BER detecting unit for detecting BER, prior to decoding, of the digital broadcast signals.

Another aspect includes a control unit further configured to operate the first and the second receiving units base upon the SNRs and the BER.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or similar parts.

First of all, a diversity technique will be described herein which enhances reception signal quality in a wireless communication system. A receiving apparatus in a system employing this diversity technique typically includes at least two antennas to enhance reception signal quality than what would normally be possible with only a conventional receiver with a single antenna. These techniques may be accomplished by selecting, switching, or combining signals received by the two antennas. For clarity, various embodiments will be described with regard to the use of two receiving units and a corresponding two antennas. However, such techniques apply equally to implementations having more than two receiving units and antennas.

Figure 1:
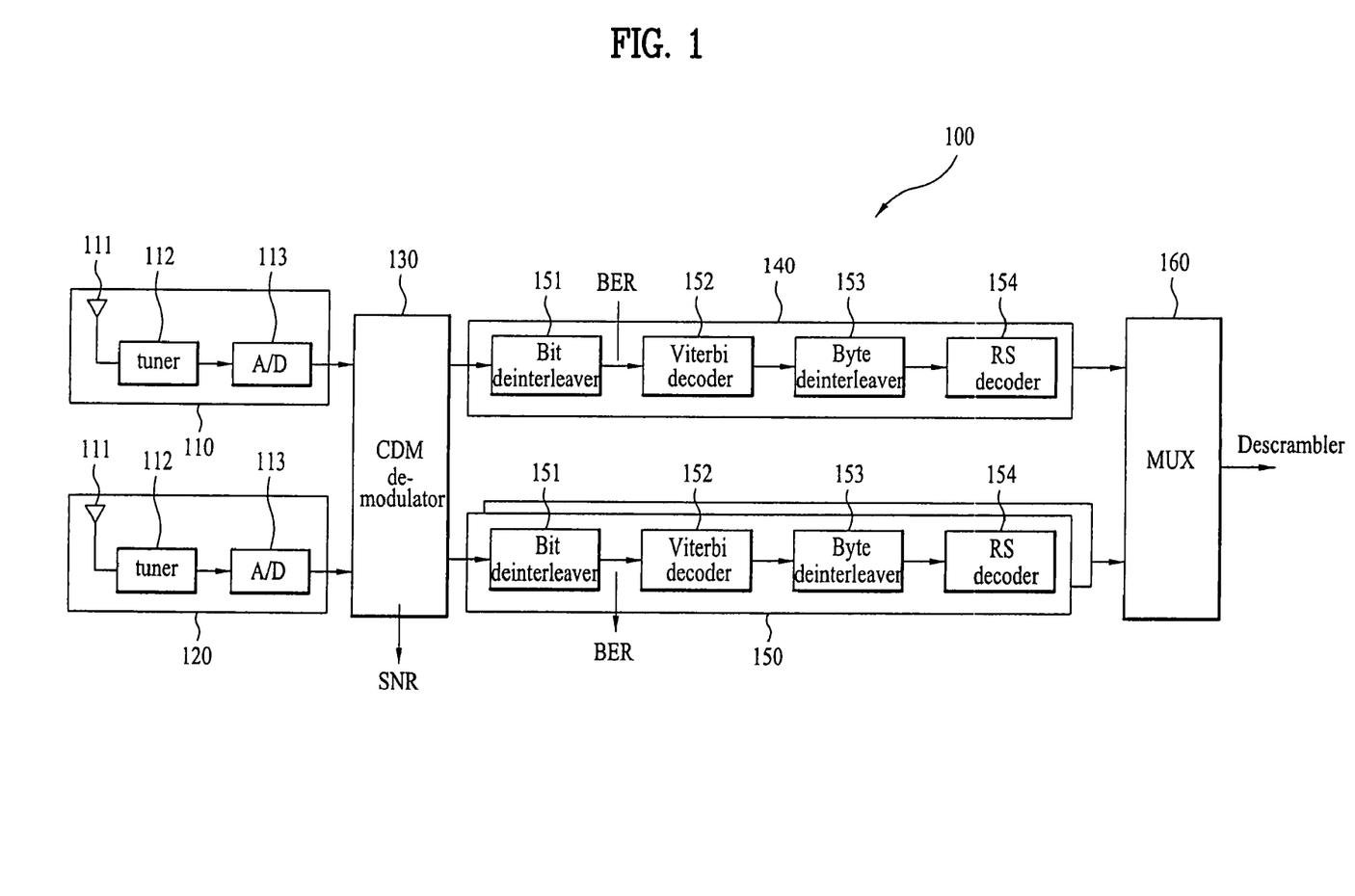
FIG. 1 is a schematic block diagram of a system-E type digital broadcast receiver configured to receive digital broadcast signals.

FIG. 1 is a schematic block diagram of a system-E type digital broadcast receiver 100 configured to receive digital broadcast signals. In this figure, the digital broadcast receiver includes first receiving unit 110, second receiving unit 120, and code division multiplexing (CDM) demodulator 130 demodulating signals provided from first and second receiving units 110 and 120. The broadcast receiver further includes decoding units 140 and 150 for detecting and correcting errors contained in signals despreaded from the CDM demodulator 130. MUX block 160 is shown multiplexing a signal provided from each of the decoding units 140 and 150, and responsively communicating a signal to a descrambler.

First and second receiving units 110 and 120 each include antenna 111, tuner 112, and an analog/digital (A/D) converter 113. Decoding units 140 and 150 each include bit deinterleaver 151, Viterbi decoder 152, byte deinterleaver 153, and Reed-Solomon (RS) decoder 154. In this figure, receiving units 110 and 120, and decoding units 140 and 150, are similarly constructed, but differ from each other according to the control signals used to operate these components.

In accordance with an embodiment, CDM demodulator 130 provides a signal-to-noise ratio (SNR) signal for each of the first and second receiving units. In addition, first and second decoding units 140 and 150 each provide a bit error rate (BER). Each of these BERs are detected prior to Viterbi decoding. The BER provided by second decoding unit 150 is not always necessary, and various embodiments only can utilize the BER from first decoding unit 140.

Figure 2:
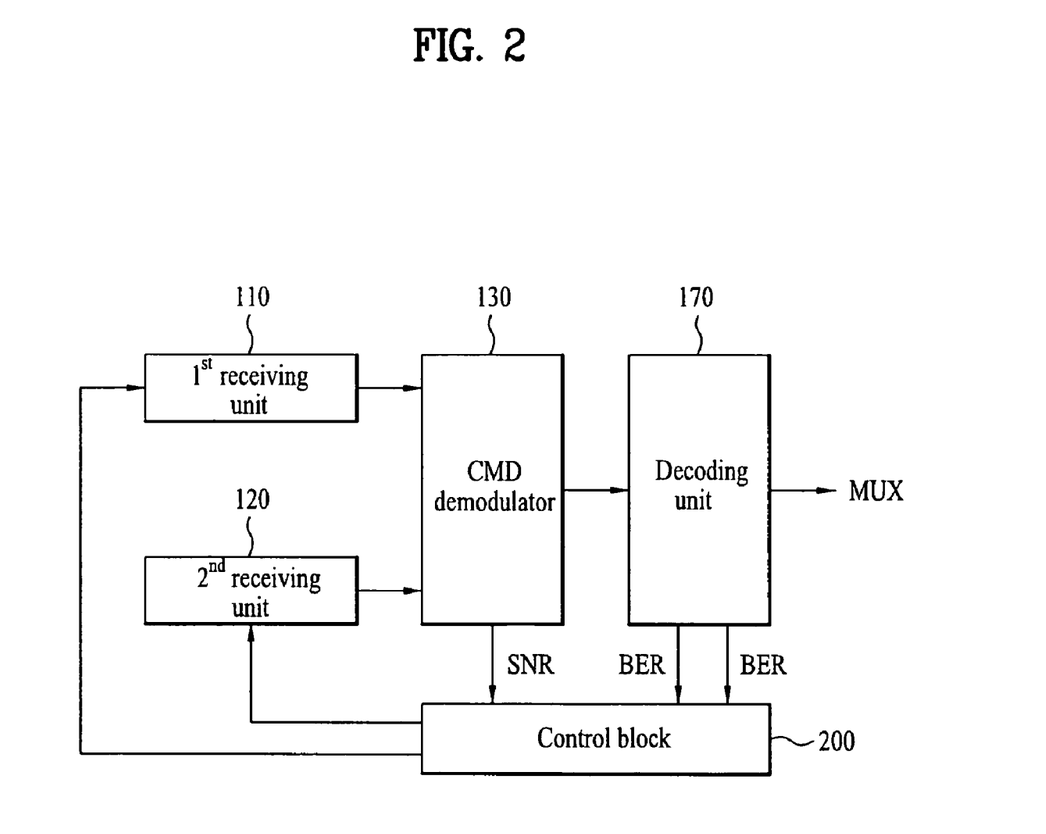
FIG. 2 is a schematic block diagram of a portion of the digital broadcast receiver of FIG. 1.

FIG. 2 is a schematic block diagram of a portion of the digital broadcast receiver of FIG. 1. In FIG. 2, first and second receiving units 110 and 120 are each configured to receive digital multimedia broadcast signals. FIG. 2 also shows control unit 200 receiving input from CDM modulator 130 and decoding unit 170. For clarity, decoding units 140 and 150 (FIG. 1) are depicted in FIG. 2 using a single decoding unit 170. Control block 200 is shown receiving a SNR signal from the CDM demodulator, and two BER signals from decoding unit 170.

Using techniques that will be described in more detail in conjunction with later figures, control unit 200 may be configured to control first and second receiving units 110 and 120 according to the condition of the reception environment within which the receiver is located. For instance, when the receiver is in a relatively good reception environment, one of the two receiving units is activated (i.e., either first or second receiving unit 110, 120). This results in reduced power consumption since power need not be supplied to the tuner and A/D converter associated with the deactivated receiving unit. However, whenever the reception environment falls below a certain quality threshold, then both the first and second receiving units are activated.

Figure 3:
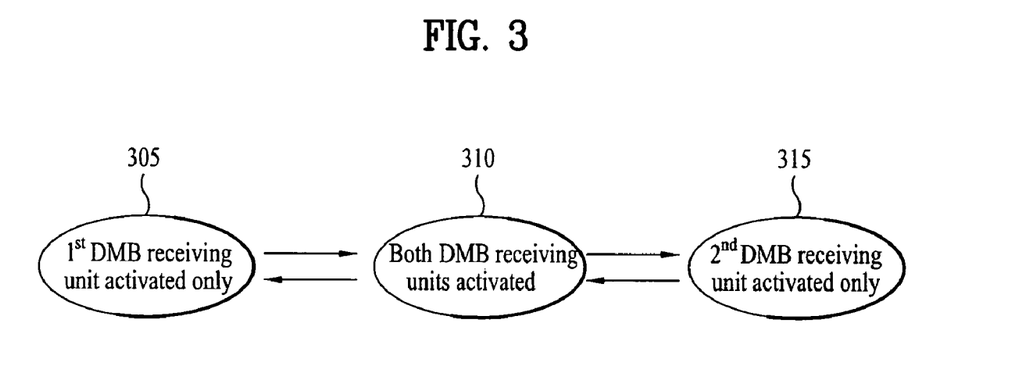
FIG. 3 is a state diagram depicting transitions between active antennas.

FIG. 3 depicts a status transition diagram in accordance with an embodiment of the present invention. At state 305, only first receiving unit 110 is activated. The only option for changing this state is to activate both first and second receiving units 110, 120, as shown in state 310. In state 310, there are two options. The first option being a transition back to state 305, during which only first receiving unit 110 is activated. The second option is to transition to state 315, during which only second receiving unit 120 is activated.

In accordance with the diagram of FIG. 3, there is no direct transition between states 305 and 315. As such, it is not possible to transition from an activated first receiving unit 110 (state 305) directly to the activation of only second receiving unit 120 (state 315), and vice versa. Such a transition from state 305 to 315 must pass through state 310, such that both the first and second receiving units are concurrently active for a certain time period.

In accordance with embodiments of the present invention, state transitions may be driven responsive to changes in reception environment. For example, control block 200 (FIG. 2) may obtain various parameters, and combinations thereof, on a periodic or other basis to determine if a transition condition exists. Examples of such parameters include:

Bit error rate prior to Viterbi decoding;
SNR of first receiving unit 110, obtained from CDM modulator 130;
SNR of second receiving unit 120, obtained from CDM modulator 130; and
Information indicating that a synchronized reference finger is assigned to an antenna of a particular receiving unit.

Upon transitioning from one state to another state, automatic gain control (AGC) values of the newly activated receiving unit may be adjusted. This operation is performed so that an auto gain control loop can quickly converge to promptly adapt to the newly active status of the corresponding receiving unit.

When a transition is made to the state in which both the first and second receiving units are activated (state 310), the AGC value of the previous receiving unit may be used to reset the AGC value of the newly activated receiving unit. Consider, for example, a transition from state 305 to state 310. In such a transition, the AGC value associated with first receiving unit 110 may be used to reset the AGC value of the newly activated second receiving unit 120. Sharing of the automatic gain control value permits early stabilization of the newly active, second receiving unit.

Figure 4:
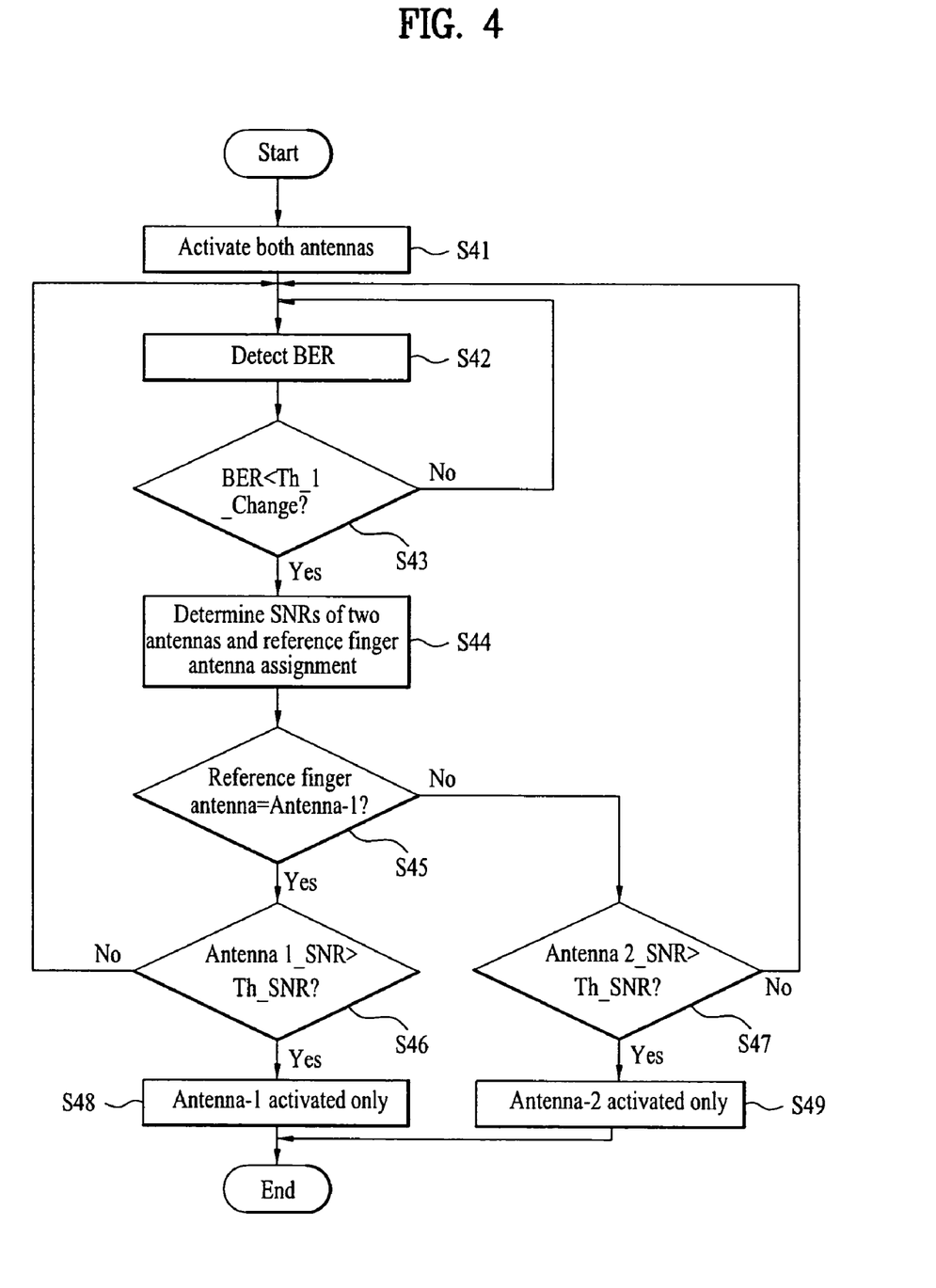
FIG. 4 is a flowchart depicting a method for controlling power of a digital broadcast receiving terminal according to an embodiment of the present invention.

FIG. 4 is a flowchart depicting a method for controlling power of a digital broadcast receiving terminal according to an embodiment of the present invention. In block S41, both antennas are activated. Such a scenario typically occurs whenever the receiver is located within a compromised reception environment and the use of two antennas is desired to enhance reception. At block S42, bit error rate (BER) prior to Viterbi decoding is detected. The BER may be obtained from either of the decoding units, and is usually detected on a regular or periodic basis (e.g., about every 500 ms-1 second).

At decision block S43, the detected BER is compared with an error threshold value (Th_1_change). A relatively poor reception environment may be characterized by a BER value that meets or exceeds the error threshold value (Th_1_change). On the other hand, a BER value that is less than the error threshold value (Th_1_change) indicates the presence of an acceptable reception environment, in which only a single antenna is needed.

The error threshold value (Th_1_change) may be modified to meet a particular or desired performance criteria. For example, lowering the error threshold value (Th_1_change) will increase the number of instances during which both antennas are active. This will cause a corresponding increase in the amount of power necessary to support the two active antennas. On the other hand, raising the error threshold value (Th_1_change) will decrease the number of instances during which both antennas are active. This will result in a corresponding decrease in power consumption.

Referring still to block S43, if the BER meets or exceeds the error threshold value (Th_1_change), then no change of state is desired and control flows back to block S42 so that another BER value may be determined. On the other hand, if the BER is less than the error threshold value (Th_1_change), then control flows to block S44.

At block S44, signal-to-noise ratios (SNRs) of both antennas, as well as the reference finger assignment, is determined. The reference finger assignment provides information relating to which of the two antennas the reference finger is assigned.

According to decision block S45, if the reference finger is not assigned to the first antenna (i.e., the first receiving unit), then control flows to block S47. Otherwise, if the reference finger is assigned to the first receiving unit, control flows to block S46.

Referring first to block S46, if the SNR of the first antenna exceeds a predetermined threshold (Th_SNR), such a condition indicates that the reception conditions are acceptable for a single active antenna. Accordingly, in such a scenario, control flows to block S48 for transitioning from a two antenna receiver to a single antenna receiver. In particular, the second antenna is deactivated so that the first antenna remains the only active antenna. On the other hand, a SNR that is equal to or less than the predetermined threshold (Th_SNR) indicates that reception conditions are unacceptable for a single antenna. In this case, use of two active antennas is maintained and controls flows back to block S42.

As set forth in blocks S47 and S49, and in a manner similar to that used for blocks S46 and S48, the first antenna is deactivated resulting in only the second antenna being active.

Figure 5:
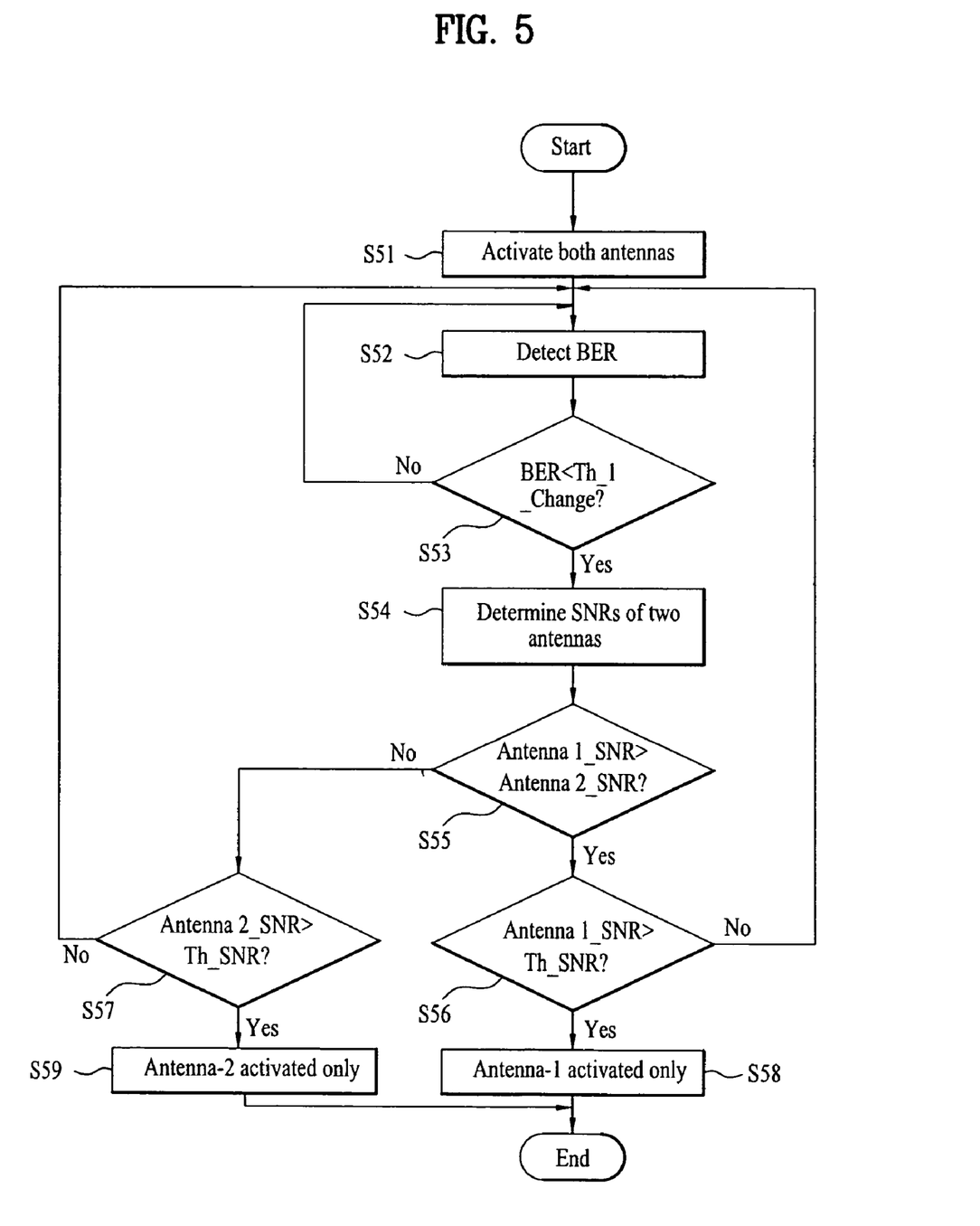
FIG. 5 is a flowchart depicting a method for controlling power of a digital broadcast receiving terminal according to an alternative embodiment of the present invention.

FIG. 5 is a flowchart depicting a method for controlling power of a digital broadcast receiving terminal according to an alternative embodiment of the present invention. In block S51, both antennas are activated. As before, such a scenario typically occurs whenever the receiver is located within a compromised reception environment and the use of two antennas is desired to enhance reception.

At block S52, BER prior to Viterbi decoding is detected. The BER may be obtained from either of the decoding units, and may be detected on a regular or periodic basis (e.g., every 500 ms-1 second).

At decision block S53, the detected BER is compared with an error threshold value (Th_1_change). If the BER meets or exceeds the error threshold value (Th_1_change), then no change of state is desired and control flows back to block S52 so that another BER value may be determined. On the other hand, if the BER is less than the error threshold value (Th_1_change), then control flows to block S54.

At block S54, signal-to-noise ratios (SNRs) of the two active antennas are determined. Next, at decision block S55, the SNRs of each of the two antennas are compared to identify the best antenna to activate. As shown in FIG. 5, if the SNR of the first antenna is less than or equal to the second antenna, then control flows to block S57. Otherwise, control flows to block S56.

Referring first to block S56, if the SNR associated with the first antenna exceeds a predetermined threshold (Th_SNR), such a condition indicates that the reception conditions are acceptable for using a single active antenna. Accordingly, in such a scenario, control flows to block S58 for transitioning from a two antenna receiver to a single antenna receiver. In particular, the second antenna is deactivated so that the first antenna remains the only active antenna. On the other hand, a SNR that is less than or equal to the predetermined threshold (Th_SNR) indicates that reception conditions are unacceptable for using a single antenna. In this case, use of two active antennas is maintained and controls flows back to block S52.

As set forth in blocks S57 and S59, the receiver transitions from a two antenna receiver to a single antenna receiver such that only the second antenna remains active. This transition would only be performed if the SNR of the second antenna meets or exceeds the SNR of the first antenna. Operations of blocks S57 and S59 may be performed in a manner similar to that used for blocks S56 and S58.

In general, the embodiment of FIG. 5 provides for transitioning from using two antennas to the use of a single active antenna if the reception environment is acceptable, and if an identified antenna has a SNR which exceeds a predetermined threshold (Th_SNR). As previously noted, receiver fingers may lose their synchronization during transition between states. Accordingly, the embodiment of FIG. 5 may take longer to accomplish this transition than what would be typically necessary for the embodiment of FIG. 4.

Figure 6:
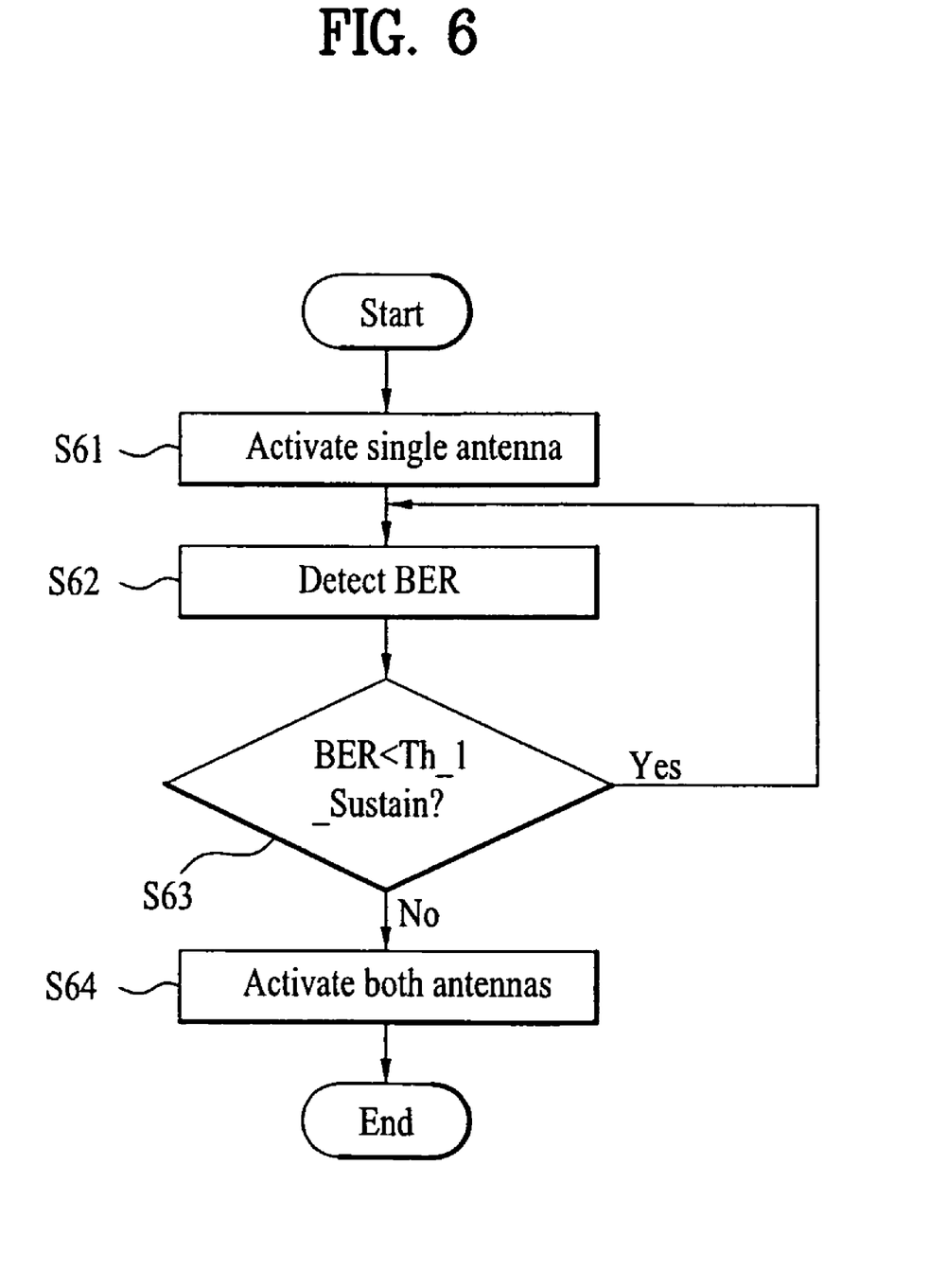
FIG. 6 is a flowchart depicting a method for controlling power of a digital broadcast receiving terminal according to yet another alternative embodiment of the present invention.

FIG. 6 is a flowchart depicting a method for controlling power of a digital broadcast receiving terminal according to yet another alternative embodiment of the present invention. In block S61, a single antenna is activated. This is in contrast to the embodiments of FIGS. 4 and 5 which initially have two activated antennas. At block S62, the BER prior to Viterbi decoding is detected. The detected BER relates to the activated antenna, such that the BER may be detected from either first receiving unit 140 or second receiving unit 150. The BER may be detected on a regular or periodic basis (e.g., every 500 ms-1 second).

At decision block S63, the detected BER is compared with a threshold value (Th_1_sustain). If the BER is less than the threshold value (Th_1_sustain), then no change of state is necessary (i.e., the reception level is acceptable and there is no need for two active antennas). In such a scenario, control flows back to block S62 so that another BER may be determined. On the other hand, if the BER is equal to or is less than the threshold value (Th_1_sustain), then control flows to block S64.

In block S64, the receiver transitions from a single active antenna receiver to a receiver having two active antennas. In activating the second antenna, it is useful to obtain the auto gain control (AGC) value associated with the currently active antenna, and utilize this information during activation of the newly active, second antenna. Sharing of the AGC value between the antennas reduces the amount of time necessary for the newly active antenna to stabilize. Sharing of the AGC is usually appropriate since the reception environment of the two receiving units, which individually include the first and second antennas, are substantially the same.

Various embodiments of the present invention provide a number of advantages over conventional systems. For instance, use of two active antennas enhances reception within compromised reception environments. Moreover, selectively transitioning to a single active antenna within a relatively good reception environment provides for reduced power consumption since only a single antenna and associated components require power. Lastly, compared to the unconditional application of antenna diversity, the embodiments presented herein can provide greater reduction in power consumption needs.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A method for controlling a digital broadcast receiving terminal, comprising:
   initially activating a first receiving unit and a second receiving unit;
   receiving a digital broadcast signal at the first and second receiving units;
   determining a reception environment based upon said digital broadcast signal; and
   selectively operating said first and said second receiving units based upon said reception environment;
   wherein said determining said reception environment comprises:
   determining a signal-to-noise ratio (SNR) for an antenna associated with at least one of said first or said second receiving units;
   detecting bit error rate (BER), prior to decoding, of said digital broadcast signal, wherein if said BER does not exceed a first threshold value, then said determining said reception environment further comprises:
   determining an activated receiving unit, said activated receiving unit being defined as one of said first or said second receiving units that is assigned to a reference finger; and
   determining a signal-to-noise ratio (SNR) for an antenna associated with said activated receiving unit, wherein if said SNR exceeds a second threshold value, then said method further comprises:
   applying power to said activated receiving unit; and
   discontinuing power to a discontinued receiving unit, said discontinued receiving unit being defined as one of said first or said second receiving units that is not assigned to said reference finger.

2. A method for controlling a digital broadcast receiving terminal, comprising:
   initially activating a first receiving unit and a second receiving unit;
   receiving a digital broadcast signal at the first and second receiving units;
   determining a reception environment based upon said digital broadcast signal; and
   selectively operating said first and said second receiving units based upon said reception environment;
   wherein said determining said reception environment comprises:
   determining a signal-to-noise ratio (SNR) for an antenna associated with at least one of said first or said second receiving units; and
   detecting bit error rate (BER), prior to decoding, of said digital broadcast signal, wherein if said BER does not exceed a threshold value, then said determining said reception environment further comprises:

identifying an activated receiving unit, said activated receiving unit being defined as one of said first or said second receiving units that includes an antenna having a relatively higher signal-to-noise ratio (SNR);
applying power to said activated receiving unit; and
discontinuing power to a discontinued receiving unit, said discontinued receiving unit being defined as one of said first or said second receiving units that includes an antenna having a relatively lower SNR.

3. The method of claim 1, further comprising:
applying power to said first and said second receiving units if said reception environment does not meet a predetermined quality level, then said method; and
applying power to said first receiving unit and discontinuing power to said second receiving unit if said reception environment meets or exceeds said predetermined quality level when the antenna associated with the first receiving unit and the antenna associated with the second receiving unit are activated.

4. The method according to claim 3, wherein applying power to said first and said second receiving units comprises:
applying power to a tuner and an analog/digital (A/D) converter associated with said first receiving unit; and
applying power to a tuner and an analog/digital (A/D) converter associated with said second receiving unit.

5. The method according to claim 3, wherein applying power to said first receiving unit and discontinuing power to said second receiving unit comprises:
applying power to a tuner and an analog/digital (A/D) converter associated with said first receiving unit; and
discontinuing power to a tuner and an analog/digital (A/D) converter associated with said second receiving unit.

6. The method according to claim 3, further comprising:
repeatedly determining said reception environment; and
either applying power to said first and said second receiving units or applying power to said first receiving unit and discontinuing power to said second receiving unit based upon the result of the determination.

7. A method for controlling a digital broadcast receiving terminal, comprising:
receiving a digital broadcast signal at first and second receiving units;
determining a reception environment based upon said digital broadcast signal; and
selectively operating said first and said second receiving units based upon said reception environment;
wherein said determining said reception environment comprises:
determining a signal-to-noise ratio (SNR) for an antenna associated with at least one of said first or said second receiving units;
detecting bit error rate (BER), prior to decoding, of said digital broadcast signal;
determining a signal-to-noise ratio (SNR) for an antenna associated with said first receiving unit;
determining a SNR for an antenna associated with said second receiving unit; and
determining reference finger antenna assignment to identify which antenna of said first and said second receiving unit is assigned to said reference finger.

8. A method for controlling a digital broadcast receiving terminal, comprising:
receiving a digital broadcast signal at first and second receiving units;
determining a reception environment based upon said digital broadcast signal; and
selectively operating said first and said second receiving units based upon said reception environment;
wherein determining said reception environment comprises determining a signal-to-noise ratio (SNR) for an antenna associated with at least one of said first or said second receiving units;
wherein if said reception environment does not meet a predetermined quality level while only said first receiving unit is activated, then said method further comprises:
obtaining an auto gain control (AGC) value associated with said currently activated first receiving unit;
utilizing said AGC value for said second receiving unit to facilitate antenna stabilization; and
activating said second receiving unit so that both said first and said second receiving units are concurrently activated.

9. A receiver for a digital broadcast terminal, comprising:
an initially activated first receiving unit for receiving a digital broadcast signal;
an initially activated second receiving unit for receiving said digital broadcast signal; and
a control unit configured to:
determine a reception environment based upon said digital broadcast signal and by determining a signal-to-noise ratio (SNR) for an antenna associated with at least one of said first or said second receiving units;
selectively operate said first and said second receiving units based upon said reception environment; and
detect bit error rate (BER), prior to decoding, of said digital broadcast signal, wherein if said BER does not exceed a first threshold value, then said control unit is further configured to:
determine an activated receiving unit, said activated receiving unit being defined as one of said first or said second receiving units that is assigned to a reference finger; and
determine a signal-to-noise ratio (SNR) for an antenna associated with said activated receiving unit, wherein if said SNR exceeds a second threshold value, then said control unit is further configured to:
apply power to said activated receiving unit; and
discontinue power to a discontinued receiving unit, said discontinued receiving unit being defined as one of said first or said second receiving units that is not assigned to said reference finger.

10. A receiver for a digital broadcast terminal, comprising:
an initially activated first receiving unit for receiving a digital broadcast signal;
an initially activated second receiving unit for receiving said digital broadcast signal; and
a control unit configured to:
determine reception environment based upon said digital broadcast signal and by determining a signal-to-noise ratio (SNR) for an antenna associated with at least one of said first or said second receiving units;
selectively operate said first and said second receiving units based upon said reception environment; and
detect bit error rate (BER), prior to decoding, of said digital broadcast signal, wherein if said BER does not exceed a threshold value, then said control unit is further configured to:
identify an activated receiving unit, said activated receiving unit being defined as one of said first or said second receiving units that includes an antenna having a relatively higher signal-to-noise ratio (SNR);
apply power to said activated receiving unit; and discontinue power to a discontinued receiving unit, said discontinued receiving unit being defined as one of said first or said second receiving units that includes an antenna having a relatively lower SNR.

11. The receiver according to claim 9, wherein said control unit is further configured to:
apply power to said first and said second receiving units if said reception environment does not meet a predetermined quality level, and
apply power to said first receiving unit and discontinue power to said second receiving unit if said reception environment meets or exceeds said predetermined quality level when the antenna associated with the first receiving unit and the antenna associated with the second receiving unit are activated.

12. The receiver according to claim 11, wherein said control unit is further configured to apply power to said first and said second receiving units by:
applying power to a tuner and an analog/digital (A/D) converter associated with said first receiving unit; and
applying power to a tuner and an analog/digital (A/D) converter associated with said second receiving unit.

13. The receiver according to claim 11, wherein said control unit is further configured to apply power to said first receiving unit and discontinue power said second receiving unit by:
applying power to a tuner and an analog/digital (A/D) converter associated with said first receiving unit; and
discontinuing power to a tuner and an analog/digital (A/D) converter associated with said second receiving unit.

14. The receiver according to claim 11, wherein said control unit is further configured to:
repeatedly determine said reception environment; and
either apply power to said first and said second receiving units or apply power to said first receiving unit and discontinue power to said second receiving unit based upon the result of the determination.

15. A receiver for a digital broadcast terminal, comprising:
a first receiving unit for receiving a digital broadcast signal;
a second receiving unit for receiving said digital broadcast signal; and
a control unit configured to:
determine reception environment based upon said digital broadcast signal and by determining a signal-to-noise ratio (SNR) for an antenna associated with at least one of said first or said second receiving units;
selectively operate said first and said second receiving units based upon said reception environment;
detect bit error rate (BER), prior to decoding, of said digital broadcast signal;
determine a signal-to-noise ratio (SNR) for an antenna associated with said first receiving unit;
determine a SNR for an antenna associated with said second receiving unit; and
determine reference finger antenna assignment to identify which antenna of said first and said second receiving unit is assigned to said reference finger.

16. A receiver for a digital broadcast terminal, comprising:
a first receiving unit for receiving a digital broadcast signal;
a second receiving unit for receiving said digital broadcast signal; and
a control unit configured to:
determine reception environment based upon said digital broadcast signal and by determining a signal-to-noise ratio (SNR) for an antenna associated with at least one of said first or said second receiving units; and selectively operate said first and said second receiving units based upon said reception environment,
wherein if said reception environment does not meet a predetermined quality level while only said first receiving unit is activated, then said control unit is further configured to:
obtain an auto gain control (AGC) value associated said first receiving unit, which is currently activated;
utilize said AGC value for said second receiving unit to facilitate antenna stabilization; and
activate said second receiving unit so that both said first and said second receiving units are concurrently activated.

17. A method for controlling a digital broadcast receiving terminal, said method comprising:
receiving a digital broadcast signal at first and second receiving units, both of said first and said second receiving units being initially activated;
determining reception environment based upon said digital broadcast signal, wherein determining said reception environment comprises:
detecting bit error rate (BER), prior to decoding, of said digital broadcast signal, wherein when said BER does not exceed a first threshold value, said determining said reception environment further comprises:
determining an activated receiving unit, said activated receiving unit being defined as one of said first or said second receiving units that is assigned to a reference finger;
determining a signal-to-noise ratio (SNR) for an antenna associated with said activated receiving unit, wherein when said SNR exceeds a second threshold value, said method further comprises:
applying power to said activated receiving unit; and
discontinuing power to a discontinued receiving unit, said discontinued receiving unit being defined as one of said first or said second receiving units that is not assigned to said reference finger.

18. A method for controlling a digital broadcast receiving terminal, said method comprising:
receiving a digital broadcast signal at first and second receiving units, both of said first and said second receiving units being initially activated;
determining reception environment based upon said digital broadcast signal, wherein said determining said reception environment comprises:
detecting bit error rate (BER), prior to decoding, of said digital broadcast signal, wherein when said BER does not exceed a threshold value, said determining said reception environment further comprises:
identifying an activated receiving unit, said activated receiving unit being defined as one of said first or said second receiving units that includes an antenna having a higher signal-to-noise ratio (SNR);
applying power to said activated receiving unit; and
discontinuing power to a discontinued receiving unit, said discontinued receiving unit being defined as one of said first or said second receiving units that includes an antenna having a relatively lower SNR.

19. A method for controlling a digital broadcast receiving terminal, said method comprising:
receiving a digital broadcast signal at first and second receiving units;
determining reception environment based upon said digital broadcast signal; and
selectively operating said first and said second receiving units based upon said reception environment;

wherein said determining said reception environment comprises:
  detecting bit error rate (BER), prior to decoding, of said digital broadcast signal;
  determining a signal-to-noise ratio (SNR) for an antenna associated with said first receiving unit;
  determining a SNR for an antenna associated with said second receiving unit; and
  determining reference finger antenna assignment to identify which antenna of said first and said second receiving unit is assigned to said reference finger.

20. A method for controlling a digital broadcast receiving terminal, said method comprising:
  receiving a digital broadcast signal at first and second receiving units;
  determining reception environment based upon said digital broadcast signal; and
  selectively operating said first and said second receiving units based upon said reception environment;
  wherein when said reception environment does not meet a predetermined quality level while only said first receiving unit is activated, said method further comprises:
  obtaining an auto gain control (AGC) value associated with said first receiving unit, which is currently activated;
  utilizing said AGC value for said second receiving unit to facilitate antenna stabilization; and
  activating said second receiving unit so that both said first and said second receiving units are concurrently activated.

21. A receiver for a digital broadcast terminal, said receiver comprising:
  a first receiving unit for receiving a digital broadcast signal, said first receiving unit being initially activated;
  a second receiving unit for receiving said digital broadcast signal, said second receiving unit being initially activated; and
  a control unit configured to:
    detect bit error rate (BER), prior to decoding, of said digital broadcast signal, wherein when said BER does not exceed a first threshold value, said control unit is further configured to:
    determine an activated receiving unit, said activated receiving unit being defined as one of said first or said second receiving units that is assigned to a reference finger;
    determine a signal-to-noise ratio (SNR) for an antenna associated with said activated receiving unit, wherein when said SNR exceeds a second threshold value, then said control unit is further configured to:
    apply power to said activated receiving unit; and
    discontinue power to a discontinued receiving unit, said discontinued receiving unit being defined as one of said first or said second receiving units that is not assigned to said reference finger.

22. A receiver for a digital broadcast terminal, said receiver comprising:
  a first receiving unit for receiving a digital broadcast signal, said first receiving unit being initially activated;
  a second receiving unit for receiving said digital broadcast signal, said second receiving unit being initially activated; and
  a control unit configured to:
    detect bit error rate (BER), prior to decoding, of said digital broadcast signal, wherein when said BER does not exceed a threshold value, said control unit is further configured to:
    identify an activated receiving unit, said activated receiving unit being defined as one of said first or said second receiving units that includes an antenna having a relatively higher signal-to-noise ratio (SNR);
    apply power to said activated receiving unit; and
    discontinue power to a discontinued receiving unit, said discontinued receiving unit being defined as one of said first or said second receiving units that includes an antenna having a relatively lower SNR.

23. A receiver for a digital broadcast terminal, said receiver comprising:
  a first receiving unit for receiving a digital broadcast signal;
  a second receiving unit for receiving said digital broadcast signal;
  a control unit configured to:
    detect bit error rate (BER), prior to decoding, of said digital broadcast signal;
    determine a signal-to-noise ratio (SNR) for an antenna associated with said first receiving unit;
    determine a SNR for an antenna associated with said second receiving unit;
    determine reference finger antenna assignment to identify which antenna of said first and said second receiving unit is assigned to said reference finger; and
    selectively operate said first and said second receiving units based upon said reception environment.

24. A receiver for a digital broadcast terminal, said receiver comprising:
  a first receiving unit for receiving a digital broadcast signal;
  a second receiving unit for receiving said digital broadcast signal; and
  a control unit configured to:
    determine reception environment based upon said digital broadcast signal; and
    selectively operate said first and said second receiving units based upon said reception environment;
  wherein when said reception environment does not meet a predetermined quality level while only said first receiving unit is activated, said control unit is further configured to:
    obtain an auto gain control (AGC) value associated with said first receiving unit, which is currently activated;
    utilize said AGC value for said second receiving unit to facilitate antenna stabilization; and
    activate said second receiving unit so that both said first and said second receiving units are concurrently activated.

25. The method of claim 2, further comprising:
  applying power to said first and said second receiving units if said reception environment does not meet a predetermined quality level; and
  applying power to said first receiving unit and discontinuing power to said second receiving unit if said reception environment meets or exceeds said predetermined quality level when the antenna associated with the first receiving unit and the antenna associated with the second receiving unit are activated.

26. The method of claim 7, further comprising:
  applying power to said first and said second receiving units if said reception environment does not meet a predetermined quality level; and
  applying power to said first receiving unit and discontinuing power to said second receiving unit if said reception environment meets or exceeds said predetermined quality level when the antenna associated with the first receiving unit and the antenna associated with the second receiving unit are activated.

27. The method of claim 8, further comprising:
applying power to said first and said second receiving units if said reception environment does not meet a predetermined quality level; and
applying power to said first receiving unit and discontinuing power to said second receiving unit if said reception environment meets or exceeds said predetermined quality level when the antenna associated with the first receiving unit and the antenna associated with the second receiving unit are activated.

28. The method of claim 17, further comprising:
applying power to said first and said second receiving units if said reception environment does not meet a predetermined quality level; and
applying power to said first receiving unit and discontinuing power to said second receiving unit if said reception environment meets or exceeds said predetermined quality level when an antenna associated with the first receiving unit and an antenna associated with the second receiving unit are activated.

29. The method of claim 18, further comprising:
applying power to said first and said second receiving units if said reception environment does not meet a predetermined quality level; and
applying power to said first receiving unit and discontinuing power to said second receiving unit if said reception environment meets or exceeds said predetermined quality level when the antenna associated with the first receiving unit and the antenna associated with the second receiving unit are activated.

30. The method of claim 19, further comprising:
applying power to said first and said second receiving units if said reception environment does not meet a predetermined quality level; and
applying power to said first receiving unit and discontinuing power to said second receiving unit if said reception environment meets or exceeds said predetermined quality level when the antenna associated with the first receiving unit and the antenna associated with the second receiving unit are activated.

31. The method of claim 20, further comprising:
applying power to said first and said second receiving units if said reception environment does not meet a predetermined quality level; and
applying power to said first receiving unit and discontinuing power to said second receiving unit if said reception environment meets or exceeds said predetermined quality level when an antenna associated with the first receiving unit and an antenna associated with the second receiving unit are activated.

32. The receiver according to claim 10, said control unit is further configured to:
apply power to said first and said second receiving units if said reception environment does not meet a predetermined quality level; and
apply power to said first receiving unit and discontinue power to said second receiving unit if said reception environment meets or exceeds said predetermined quality level when the antenna associated with the first receiving unit and the antenna associated with the second receiving unit are activated.

33. The receiver according to claim 15, wherein said control unit is further configured to:
apply power to said first and said second receiving units if said reception environment does not meet a predetermined quality level; and
apply power to said first receiving unit and discontinue power to said second receiving unit if said reception environment meets or exceeds said predetermined quality level when the antenna associated with the first receiving unit and the antenna associated with the second receiving unit are activated.

34. The receiver according to claim 16, wherein said control unit is further configured to:
apply power to said first and said second receiving units if said reception environment does not meet a predetermined quality level; and
apply power to said first receiving unit and discontinue power to said second receiving unit if said reception environment meets or exceeds said predetermined quality level when the antenna associated with the first receiving unit and the antenna associated with the second receiving unit are activated.

35. The receiver according to claim 24, wherein said control unit is further configured to:
apply power to said first and said second receiving units if said reception environment does not meet a predetermined quality level; and
apply power to said first receiving unit and discontinue power to said second receiving unit if said reception environment meets or exceeds said predetermined quality level when an antenna associated with the first receiving unit and an antenna associated with the second receiving unit are activated.

* * * * *